United States Patent
Webb

(10) Patent No.: US 9,455,111 B2
(45) Date of Patent: Sep. 27, 2016

(54) METHOD AND STRUCTURE FOR MONITORING BREAKER STATUS CONTACTS ON CIRCUIT BREAKER APPLICATIONS

(71) Applicant: ABB Inc., Cary, NC (US)

(72) Inventor: John C. Webb, Florence, SC (US)

(73) Assignee: ABB Inc., Cary, NC (US)

( * ) Notice: Subject to any disclaimer, the term of this patent is extended or adjusted under 35 U.S.C. 154(b) by 388 days.

(21) Appl. No.: 14/048,075

(22) Filed: Oct. 8, 2013

(65) Prior Publication Data

US 2014/0104068 A1 Apr. 17, 2014

Related U.S. Application Data

(60) Provisional application No. 61/714,789, filed on Oct. 17, 2012.

(51) Int. Cl.
| | |
|---|---|
| *H01H 85/32* | (2006.01) |
| *G01R 31/02* | (2006.01) |
| *G01R 31/07* | (2006.01) |
| *H01H 85/30* | (2006.01) |
| *H01H 71/12* | (2006.01) |
| *H01H 71/46* | (2006.01) |
| *H01H 73/14* | (2006.01) |
| *H01H 71/04* | (2006.01) |

(52) U.S. Cl.
CPC ........... *H01H 85/32* (2013.01); *H01H 71/123* (2013.01); *H01H 71/46* (2013.01); *H01H 73/14* (2013.01); *H01H 71/04* (2013.01); *H01H 2071/044* (2013.01)

(58) Field of Classification Search
CPC ...................................................... H01H 85/32
See application file for complete search history.

(56) References Cited

U.S. PATENT DOCUMENTS

| | | | | |
|---|---|---|---|---|
| 4,698,621 A | * | 10/1987 | Masot .................. | G08B 21/185 200/308 |
| 5,313,187 A | * | 5/1994 | Choi ........................ | G08B 5/38 315/200 A |
| 5,517,381 A | * | 5/1996 | Guim .................... | H01H 1/0015 361/102 |
| 5,847,913 A | * | 12/1998 | Turner ................. | G01R 31/025 361/115 |
| 6,864,447 B1 | * | 3/2005 | Lipsey, II ............. | H01H 73/14 200/310 |
| 2012/0162279 A1 | * | 6/2012 | Kim ..................... | G09G 3/3406 345/690 |
| 2012/0212864 A1 | * | 8/2012 | Elms .................... | H01H 47/002 361/49 |

* cited by examiner

*Primary Examiner* — Jennifer Mehmood
*Assistant Examiner* — Pameshanand Mahase
(74) *Attorney, Agent, or Firm* — Manelli Selter PLLC; Edward J. Stemberger

(57) ABSTRACT

A trip control circuit for a circuit breaker which provides for self-diagnostics includes a normally opened trip contact, a tripping circuit, and a signal light in series with the tripping circuit and the trip contact. The trip control circuit also includes a flasher circuit constructed and arranged to provide signaling of an abnormal condition of a circuit breaker to the signal light, while permitting the circuit breaker to trip provided that a cause of the abnormal condition signaled is not one which prevents tripping of the circuit breaker.

17 Claims, 5 Drawing Sheets

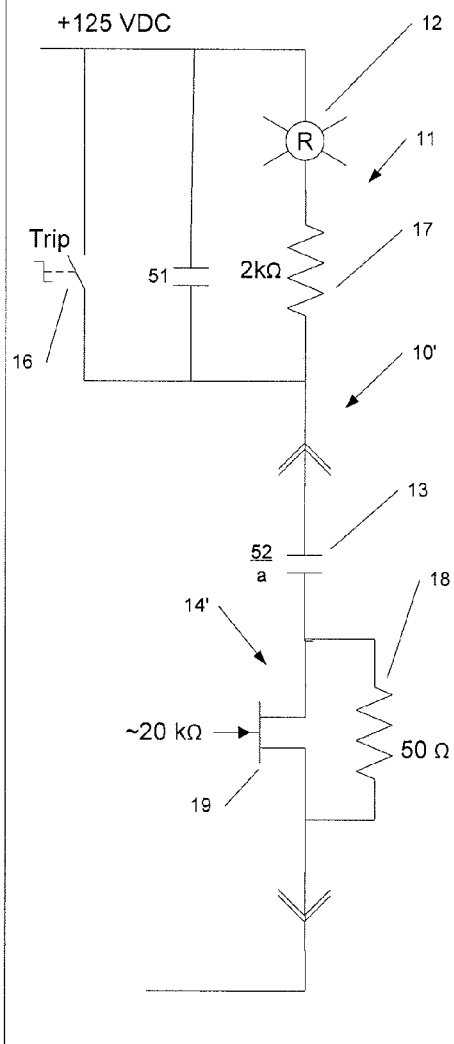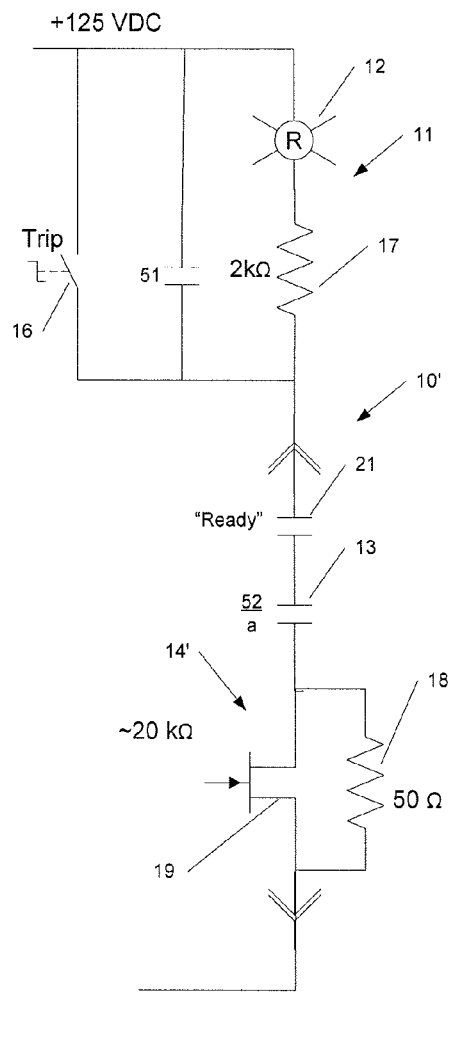
FIG 2a
(Prior Art)
FIG. 2b
(Prior Art)

METHOD AND STRUCTURE FOR MONITORING BREAKER STATUS CONTACTS ON CIRCUIT BREAKER APPLICATIONS

FIELD

The invention relates to circuit breakers with diagnostic signaling contacts and, more particularly, to a circuit breaker that includes signaling of an abnormal condition in a way that is familiar to operators.

BACKGROUND

Older circuit breakers with conventional solenoid operated trip coils frequently placed a typically red light in series with the trip coil. A trickle of current is allowed to flow through the solenoid coils and illuminate the light as a basic diagnostic indicator of the tripping circuit. Should the trip coil fail, the red light would extinguish and operators making routine checks would detect the failure and take corrective action. Such a system detects one particular type of failure, an open circuit in the system. Such an open circuit would by its nature disable the tripping function.

New circuit breakers with self-diagnostics are not limited to this type of failure, but may have a breaker trouble or a binary (on or off) "ready" or "not ready" contact to signal an abnormal condition requiring corrective action. Unfortunately, particularly on retrofit circuit breaker applications, there was no way to incorporate this "not ready" contact into the existing control scheme or of inserting it into the tripping circuit to turn off the red light without also losing the ability to trip the breaker, even in the case of abnormal conditions which ordinarily would not otherwise prevent tripping the circuit breaker. Occasionally, a user has opted to preserve the apparent functionality of the red light by putting the "ready" contact in series with the red light (and thus with the trip input) to extinguish this light for the purpose of signaling a warning or failure from the circuit breaker diagnostic system. This has the unfortunate consequence of also disabling the ability to trip the breaker electrically, even if the cause of the "not ready" condition may not be one which prevents the breaker from tripping. Prior retrofit applications in which circuit breakers with self-diagnostics have been used to replace a conventional circuit breaker which had a red light in series with the trip coil have generally ignored the advantages of self-diagnostics because of the above limitation.

Thus, there is a need to provide in a circuit breaker with self-diagnostics, a method to signal an abnormal condition using the existing red light circuit while retaining the ability to trip the circuit breaker either manually or in the event of an overcurrent condition when the cause of the unusual condition signaled is not one which prevents tripping the circuit breaker.

SUMMARY

An objective of the invention is to fulfill the need referred to above. In accordance with the principles of the present invention, this objective is achieved by providing a trip control circuit for a circuit breaker with self-diagnostics. The trip control circuit includes a normally opened trip contact, a tripping circuit having a tripping input and a signal light in series with the tripping circuit and the trip contact. The trip control circuit also includes a flasher circuit constructed and arranged to provide signaling of an abnormal condition of a circuit breaker to the signal light, while permitting the circuit breaker to trip.

In accordance with another aspect of an embodiment, wherein the circuit breaker uses high impedance solid state inputs for tripping, a method is provided for retrofitting such a trip control circuit for a circuit breaker with self-diagnostics to provide condition monitoring. The electronic trip control circuit has a normally opened trip contact, a solid state tripping circuit having high impedance tripping input and a resistor in parallel with the tripping input, and a signal light in series with the tripping circuit and the trip contact. The method provides a flasher circuit in the trip control circuit. The flasher circuit is configured to provide signaling of an abnormal condition of the circuit breaker to the signal light, while permitting the circuit breaker to trip, via the tripping input.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which:

FIG. 2a is a diagram of a conventional trip control circuit for an electronically controlled circuit breaker, which has been configured through the use of a resistor to allow for the use of a red light without causing an inadvertent trip signal to be applied across the high impedance inputs of the tripping input.

FIG. 2b is a diagram of the conventional trip control circuit of FIG. 2a, but shows a "Ready" contact in series with the red light.

DETAILED DESCRIPTION OF THE EXEMPLARY EMBODIMENTS

Figure 1:
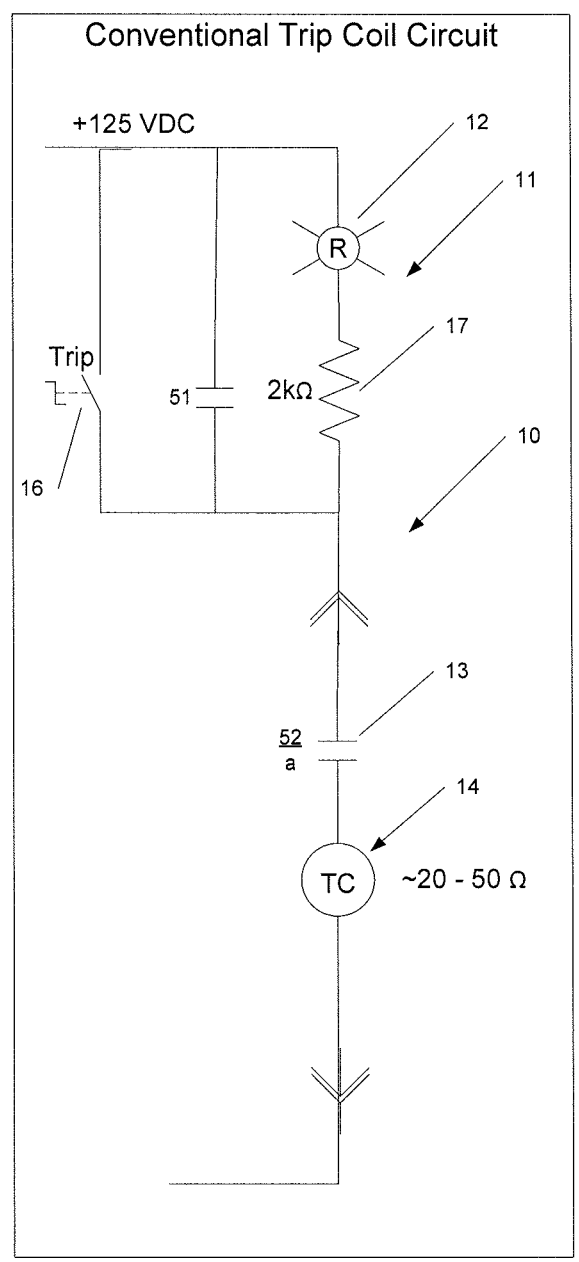
FIG. 1 is a diagram of a conventional trip coil circuit for solenoid operated trip coil of a circuit breaker.

With reference to FIG. 1, a conventional trip coil circuit is shown, generally indicated at 10, for the older technology solenoid trip coil operated circuit breaker without self-diagnostic features. The trip coil circuit 10 is connected to an electro-mechanical solenoid which actuates a mechanical release. The solenoid is typically a low-impedance high power device (about 600 W), and although there are several possible points of failure, failure of the solenoid itself is a reasonably common cause of failure. A simple and effective means of checking one failure mode of the trip coil circuit 10 in general, and of the solenoid in particular, is to place a signal light 12 in series with a breaker auxiliary contact (52/a) 13 which closes when the circuit breaker closes and trip coil 14 with a normally open trip contact 16 such that when the breaker is closed, a small trickle current (about 60 mA) flows and illuminates the light 12 (ANSI and IEEE standards designate that it be preferably in a red color). This indicates that there is power to the tripping circuit, that the circuit breaker is closed, and that the solenoid coil is intact. Because of the high impedance of the light assembly 11, (generally by using a low voltage bulb 12 and an integral dropping resistor 17) the majority of the voltage is dropped across the light/resistor combination and there is insufficient power to actuate the solenoid and trip the breaker. Tripping of the circuit breaker is accomplished by closing contacts in parallel with the light/resistor combination to bypass them, thus allowing full voltage to be applied to the solenoid, resulting in a large flow of current and causing the solenoid to move the mechanical linkages to trip the circuit breaker. Protective relays often relied on this surge of current to allow them to change display 'flags' in order to indicate which protective device and feature signaled the trip.

With reference to FIG. 2, a conventional electronic trip control circuit is shown, generally indicated at 10', for an electronically controlled circuit breaker. In such an electronically controlled circuit breaker, solid state electronics handle the release of energy to change the state of the circuit breaker. The tripping circuit, generally indicated at 14', is a solid state device with high input impedance and low power requirements. If connected into the circuit 10 of FIG. 1, without modification, the much higher impedance of the tripping circuit 14' relative to the light/resistor combination would cause the majority of the trip circuit voltage to be dropped across this tripping input where it would be interpreted as a valid tripping signal and cause the breaker to open. Additionally, the current required to actuate the tripping circuit is so low that protective relays in the circuit would not receive enough current to drop their indicating flags. The commonly accepted (prior art) solution to this problem is to place a low value resistor 18 in parallel with the tripping input 19. Under normal circumstances the majority of the voltage would be dropped across the light/resistor combination 12 and 17 and the tripping input would not detect enough voltage to cause the breaker to trip. In the event a protective relay would call for a circuit breaker trip, the light 12 would once again be bypassed and the full system voltage would be applied across the newly added resistor 18 and the tripping input. The tripping input 19 would cause the breaker to open and sufficient current would flow to cause the flags on the protective relay to drop.

The circuit 10' of FIG. 2 is functionally equivalent to the circuit 10 of FIG. 1; however, it can be easily observed that the red light 12 of FIG. 2 is no longer checking on the condition of any component of the tripping circuit inside the circuit breaker, but is only monitoring the 'health' of the resistor 18. This may be an acceptable solution if it were not for many circuit breakers with self-diagnostic features (most notably the ABB VM-1 and R-Mag circuit breakers) making available a contact that provides a much more reliable indication of the circuit breaker 'health'. In the case of VM-1 or R-Mag circuit breakers, this contact is in the form of a pair of 'Ready'/'Not Ready' contacts, other breakers with diagnostics normally provide similar contacts.

In its intended application in new switchgear assemblies, the 'Ready' or 'Not Ready' contact is connected to a dedicated alarm or warning circuit. If the application is a retrofit, this additional secondary contact may not be available and/or the time and expense of modifying the switchgear may be unacceptable to the user.

Referring to FIG. 2b, it is possible to place the 'Ready' contact 21 in series with the red light 12 and breaker auxiliary contact 13 without any modifications to the existing switchgear wiring but this also places the 'Ready' contact in series with the tripping input. Thus, any circuit breaker condition that causes the 'Ready' contact to change to a 'Not Ready' (open) condition would (correctly) extinguish the red light, but would also make it impossible to electrically trip the circuit breaker, even if the cause of the 'Not Ready' condition would not otherwise inhibit the ability of the breaker to open. With limited manpower, routine inspections of switchgear by the on-watch electrician are becoming less and less common so it is possible that a circuit breaker with a minor problem causing a "Not Ready" condition to be in that state for a significant amount of time. This is an unnecessary and unacceptable risk because the protective function of the circuit breaker has been needlessly compromised.

Figure 3:
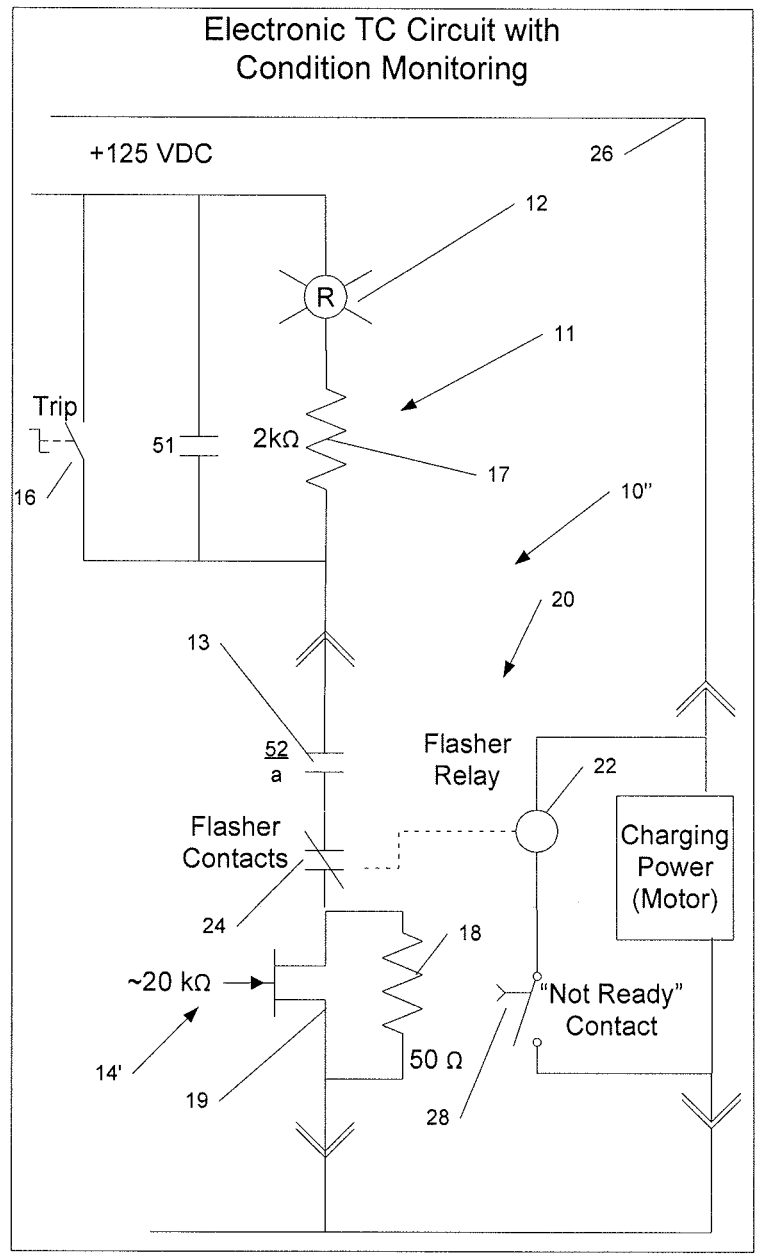
FIG. 3 is a diagram of a trip control circuit with condition monitoring for circuit breaker having self-diagnostic features and a high impedance solid state tripping circuit, provided in accordance with an embodiment.

With reference to FIG. 3 an electronic trip control circuit having condition monitoring is shown, generally indicated at 10", in accordance with an embodiment. The circuit 10" includes the circuit 10' of FIG. 2 and an additional flasher circuit, generally indicated at 20, provided in series with the red light 12 with the intended duty cycle of about 900 msec 'ON' and about 100 msec 'OFF'. The flasher circuit 20 includes a conventional flasher relay 22 in parallel with the red light 12 and associated with flasher contacts 24 that are in series with the red light 12 and tripping circuit 14. The flasher circuit 20 includes or is connected with a source of power preferably in the form of a charging power circuit 26 that provides a source of power to the flasher relay 22. This source of power is may be supplied from the same external power supply that provides energy for the circuit 10. Such a source of power already exists in typical retrofit applications. However, power can be provided from alternate power sources. A signaling or "Not Ready" contact 28 that is open in normal conditions is in series with the flasher relay 22. Thus, any circuit breaker condition that causes the "Not Ready" contact 28 to close, causes the flasher relay 22 to energize and thus provides the intermittent signaling via flasher contacts 24 to the red light 12, while permitting remotely tripping of the circuit breaker via the tripping input 19 during those periods when those contacts are closed and the light illuminated.

The flasher circuit 20 causes the failure to be even more apparent to any observer passing by due to the intermittent operation of the red light 12. The trip signal will still be able to open the circuit breaker with at most a 100 msec. delay, but in all likelihood, significantly less time. In most cases, this slight delay in the tripping of a circuit breaker (with enhanced visibility of a trouble condition) can be tolerated, particularly when balanced against getting either no indication whatsoever, or losing the ability to trip the circuit breaker completely.

The circuit 10" of the embodiment provides for signaling of an abnormal condition using the existing red light circuit and it enhances the visibility of the unusual condition by using a 'flasher' which provides an intermittent warning but at the same time also still allows the tripping signal to get through since the "Not Ready" contact 28 is not directly in the path of the tripping input 19. In particular, the circuit of the embodiment retains the ability to trip the circuit breaker either manually via the trip contact 16 or in the event of an overcurrent condition using relay contacts 51. This circuit 10" of the embodiment allows the user to take advantage of the self-diagnostic capabilities of certain modern circuit breakers while still using the traditional wiring methods commonly employed in switchgear wiring and without significantly impairing the protective function of the circuit breaker.

Figure 4:
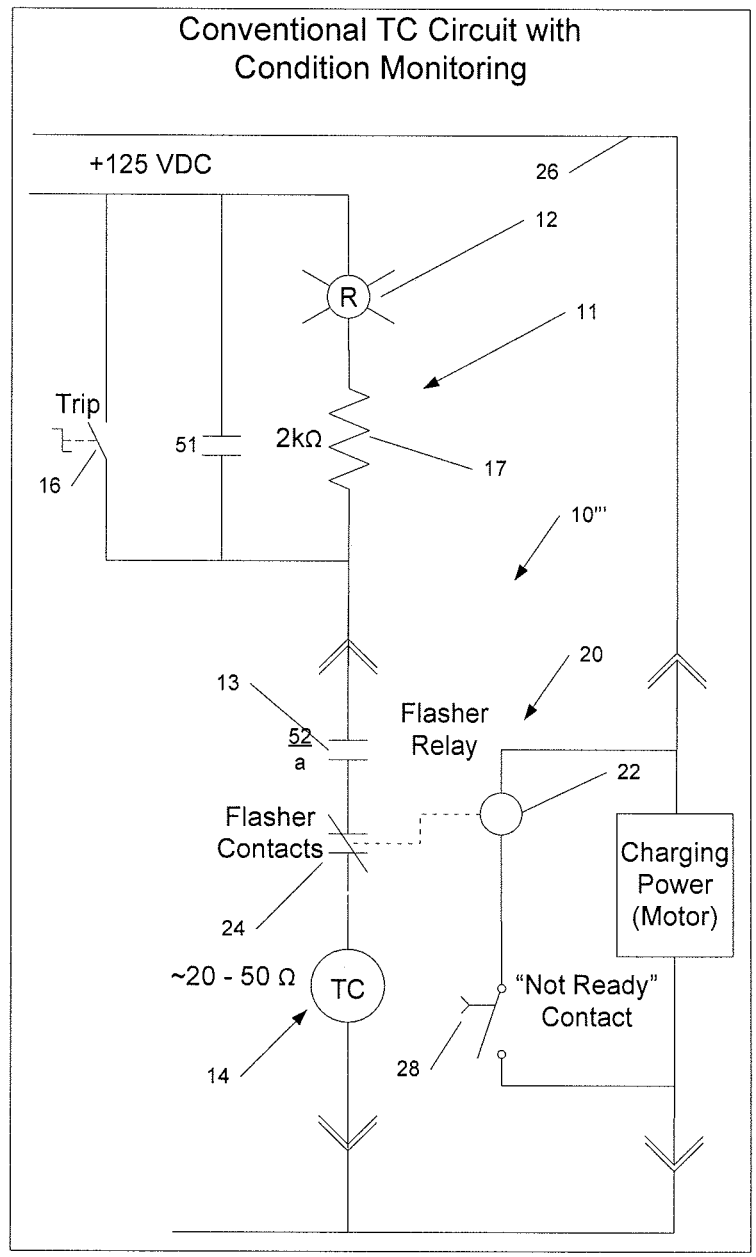
FIG. 4 is a diagram of a trip control circuit with condition monitoring for a circuit breaker having self-diagnostic features and a conventional solenoid coil operated tripping mechanism, provided in accordance with an embodiment.
Figure 5:
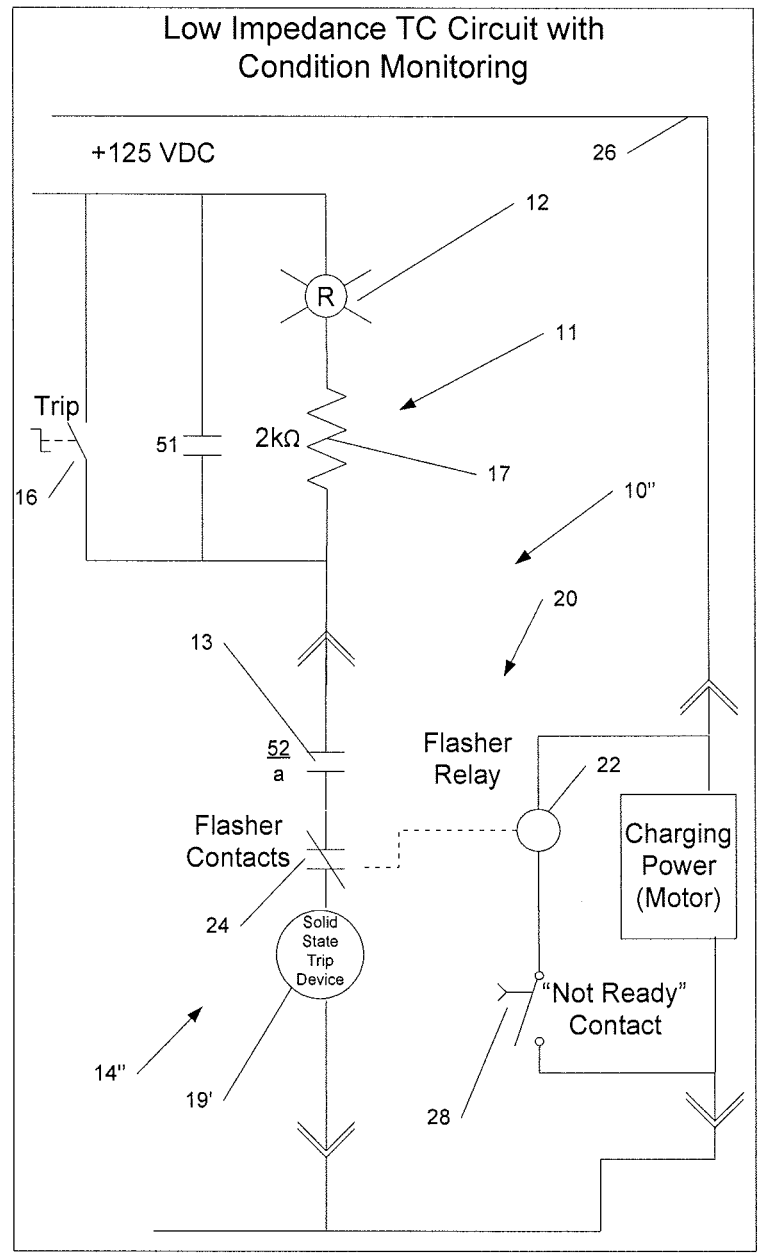
FIG. 5 is a diagram of a trip control circuit with condition monitoring for circuit breaker having self-diagnostic features and a solid state tripping circuit, not requiring an external resistor to operate properly when placed in series with an indicating light, provided in accordance with an embodiment.

It is readily apparent that the same indicating circuit components of FIG. 3 could be employed in a circuit breaker with a conventional trip coil if a circuit breaker so equipped had self-diagnostic features. This is illustrated by the trip control circuit 10''' shown in FIG. 4. The previous description of operation from FIG. 3 applies, substituting trip coil 14 for solid state tripping circuit 14'. Furthermore, FIG. 5 shows a solid state tripping circuit 14" with tripping input 19' and with condition monitoring for a circuit breaker having self-diagnostic features. The circuit 14" does not require an external resistor to operate properly when placed in series with the indicating light 12.

The embodiment provides a method to retrofit circuit breaker with self-diagnostics into an electrical scheme that is designed for an older technology solenoid controlled circuit breaker. This will most likely occur because of a retrofit situation, however it is possible that the old circuit will be specified because the user (or his consultant) is familiar and comfortable with the arrangement and do not wish to change.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A trip control circuit for a circuit breaker with self-diagnostics, the trip control circuit comprising:
    a normally opened trip contact,
    a tripping circuit,
    a signal light in series with the tripping circuit and the trip contact, and
    a flasher circuit constructed and arranged to provide signaling of an abnormal condition of a circuit breaker to the signal light, while still permitting the circuit breaker to trip after signaling of the abnormal condition by the flasher circuit.

2. The circuit of claim 1, wherein the flasher circuit is constructed and arranged to provide an intermittent signal to the signal light.

3. The circuit of claim 2, wherein the flasher circuit is constructed and arranged to have a duty cycle of about 900 msec 'ON' and about 100 msec 'OFF'.

4. A trip control circuit for a circuit breaker with self-diagnostics, the trip control circuit comprising:
    a normally opened trip contact,
    a tripping circuit,
    a signal light in series with the tripping circuit and the trip contact, and
    a flasher circuit constructed and arranged to provide signaling of an abnormal condition of a circuit breaker to the signal light, while permitting the circuit breaker to trip, wherein the flasher circuit comprises:
    a flasher relay,
    a signaling contact, open under normal conditions, in series with the flasher relay, the flasher relay and the signaling contact being in parallel with the signal light and the tripping circuit,
    a source of power for powering the flasher relay, and
    flasher contacts associated with the flasher relay and in series with the light,
    wherein when the signaling contact closes, the flasher relay provides the signaling to the light via the flasher contacts.

5. The circuit of claim 1, wherein the tripping circuit is a solid state circuit having a tripping input and a resistor in parallel with the tripping input.

6. The circuit of claim 1, wherein the tripping circuit includes a solenoid trip coil.

7. The circuit of claim 1, wherein the tripping circuit is a solid state circuit having a tripping input without a resistor in parallel with the tripping input.

8. A method of retrofitting a trip control circuit for circuit breaker with self-diagnostics to provide condition monitoring, the electronic trip control circuit having a normally opened trip contact, a solid state tripping circuit having a high impedance tripping input and a resistor in parallel with the tripping input, and a signal light in series with the tripping circuit and the trip contact, the method comprising the steps of:
    providing a flasher circuit in the trip control circuit,
    configuring the flasher circuit to provide signaling of an abnormal condition of the circuit breaker to the signal light, while permitting the circuit breaker to trip, via the tripping input,
    wherein the step of configuring the flasher circuit comprises:
    providing a flasher relay,
    providing a signaling contact, open under normal conditions, in series with the flasher relay, the flasher relay and signaling contact being in parallel with the light and the tripping circuit,
    powering the flasher relay, and
    flasher contacts associated with the flasher relay and in series with the light,
    wherein when the signaling contact closes, the flasher relay provides the signaling to the light via the flasher contacts.

9. The method of claim 8, wherein the flasher circuit provides the signaling as an intermittent signal to the signal light.

10. The method of claim 8, wherein the flasher circuit provides a duty cycle of about 900 msec 'ON' and about 100 msec 'OFF'.

11. A method of providing diagnostic signaling for circuit breaker with self-diagnostics, the circuit breaker having a trip control circuit having a normally opened trip contact, a tripping circuit, and a signal light in series with the tripping circuit and the trip contact, the method comprising the steps of:
    providing a flasher circuit in the trip control circuit,
    configuring the flasher circuit to provide signaling of an abnormal condition of the circuit breaker to the signal light, while still permitting the circuit breaker to trip after signaling of the abnormal condition by the flasher circuit.

12. The method of claim 11, wherein the step of configuring the flasher circuit comprises:
    providing a flasher relay, providing a signaling contact, open under normal conditions, in series with the flasher relay, the flasher relay and signaling contact being in parallel with the light and the tripping circuit, powering the flasher relay, and flasher contacts associated with the flasher relay and in series with the light, wherein when the signaling contact closes, the flasher relay provides the signaling to the light via the flasher contacts.

13. The method of claim 11, wherein the flasher circuit provides the signaling as an intermittent signal to the signal light.

14. The method of claim 11, wherein the flasher circuit provides a duty cycle of about 900 msec 'ON' and about 100 msec 'OFF'.

15. The method of claim 11, wherein the tripping circuit is a solid state circuit having a tripping input and a resistor in parallel with the tripping input.

16. The method of claim 11, wherein the tripping circuit includes a solenoid trip coil.

17. The method of claim 11, wherein the tripping circuit is a solid state circuit having a tripping input without a resistor in parallel with the tripping input.

* * * * *